United States Patent [19]

Fourcher

[11] 4,312,829
[45] Jan. 26, 1982

[54] MOLDING METHOD

[76] Inventor: Fredric J. Fourcher, 614 Orchid, Corona Del Mar, Calif. 92625

[21] Appl. No.: 101,806

[22] Filed: Dec. 10, 1979

[51] Int. Cl.³ ............................................... B29C 1/14
[52] U.S. Cl. ................................ 264/571; 264/101; 264/313; 264/510; 425/389
[58] Field of Search ............... 264/101, 102, 313, 510, 264/571, 316; 425/389, 388, DIG. 44

[56] References Cited

U.S. PATENT DOCUMENTS 3,861,977 1/1975 Wiley ................................. 264/571
4,132,755 1/1979 Johnson ............................. 425/389
4,165,358 8/1979 Johnson ............................. 264/571

Primary Examiner—Donald E. Czaja
Assistant Examiner—W. Thompson
Attorney, Agent, or Firm—Gordon L. Peterson

[57] ABSTRACT

A method of molding a plastic part comprising supporting first and second mold sections so as to define a mold cavity, placing a flexible sheet over the second mold section, and forming a vacuum chamber utilizing the flexible sheet with at least the second mold section being in the vacuum chamber. Air passages are provided between the flexible sheet and the second mold section. The air pressure within the vacuum chamber is reduced to less than ambient to create differential pressure across the flexible sheet to hold the second mold section in position. Plastic material is pumped into the mold cavity. After the plastic sets, the second mold section is removed.

9 Claims, 5 Drawing Figures

MOLDING METHOD

BACKGROUND OF THE INVENTION

The molding of parts of intricate shape from various flowable materials, such as plastics, is an old and highly developed art. A typical prior art plastic molding process includes supporting a first mold section and mechanically retaining a second mold section in predetermined relationship to the first mold section. For example, the second mold section may be supported on a large ram so that it can be moved into position for the molding operation and then retracted upon completion of the molding operation. This kind of molding process has the disadvantage of requiring large, heavy and expensive components, such as a ram for carrying out the molding process.

In the manufacture of boats, a sandwich construction comprising a plastic core and opposed panels is utilized. The core material is molded in large, flat sheets. To conform the sheets to the intricate curvature of the panels, the core must be scored a large number of times and, in some instances, heated. The scored and heated core material is then adhered to the panels by placing a flexible sheet over the core and a porous mat between the core and flexible sheet and evacuating the region beneath the flexible sheet. This provides a pressure dfferential across the flexible sheet which holds the core against the panel. This process is expensive and requires considerable time and auxiliary equipment, such as the heating means for the core.

SUMMARY OF THE INVENTION

The present invention provides a novel molding process which can be carried out in situ or at a manufacturer's plant. In addition, the same mold section can be utilized for the molding of parts of different configuration. The method of this invention is particularly adapted for the molding of cores for boats; however, the invention is not so limited.

The invention is carried out with first and second mold sections, each of which has a mold face of the desired configuration. The first mold section is supported with its mold face exposed. If the molding operation is to be carried out in situ, the first mold section may be a component of structure against which the molded part is to be formed. For example, in the case of a boat, the first mold section may include a portion of a fiberglass panel of a boat.

The second mold section is supported with the mold faces of the mold sections in confronting relationship to thereby define a mold cavity of the desired configuration between the mold sections. To enable the second mold section to conform to the contour of the mold face of the first mold section, the second mold section can advantageously be flexible. Accordingly, the same second mold section can be utilized in association with first mold sections of different configurations.

This invention eliminates the mechanical means utilized heretofore for holding the second mold section against the first mold section. With this invention, differential air pressure holds the second mold section against the first mold section.

This can be advantageously accomplished by placing a flexible sheet over the second mold section and forming a vacuum chamber utilizing the flexible sheet. At least the second mold section and the mold face of the first mold section are in the vacuum chamber. By reducing the pressure within the vacuum chamber to less than ambient, ambient air pressure acting on the flexible sheet holds the second mold section against the first mold section.

To assure that adequate vacuum pressure will exist between the flexible sheet and the second mold section, air passage means is provided in the vacuum chamber between the flexible sheet and the second mold section. The air passage means can be formed in different ways, such as by utilizing a mat of porous material between the flexible sheet and the second mold section and/or utilizing a plurality of projections and connecting recesses on the surface of the second mold section which confronts the flexible sheet.

Curable flowable material is flowed into the mold cavity and allowed to set to form the desired part. Thereafter, the second mold section is removed from the part.

If the molding operation is carried out in situ, the part can be adhered to the mold face of the first mold section. In the case of a boat, the section mold section may comprise projections and recesses, with the recesses forming portions of the mold cavity. In this event, the molded part defines a lightweight porous core which can be used as the core for conventional sandwich construction.

The vacuum chamber can be evacuated by a vacuum tube which is inserted between the flexible sheet and the second mold section in communication with the air passage means. When a porous mat is used between the flexible sheet and the second mold section, it allows air to travel through it even though it is held in compression. In addition, the mat prevents the plastic material from being drawn into the vacuum tube.

The edges of the flexible sheet can be sealed to surrounding structure to prevent undue leakage into the vacuum chamber. For example, the edges of the flexible sheet can be taped against the mold surface of the first mold section.

The invention, together with further features and advantages thereof, may best be understood by reference to the following description taken in connection with the accompanying illustrative drawing.

DESCRIPTION OF THE PREFERRED EMBODIMENT

Figure 1:
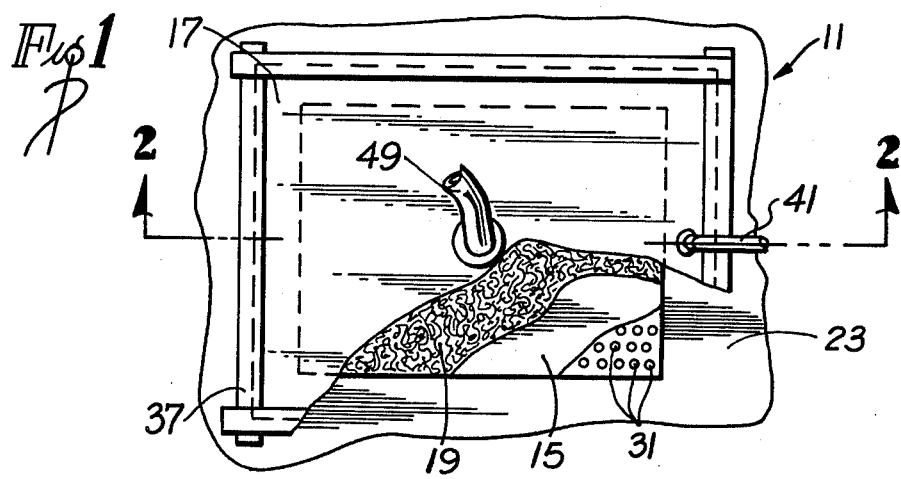
FIG. 1 is a fragmentary elevational view illustrating how the molding method of this invention can be carried out in situ. Portions of the molding apparatus are broken away in FIG. 1.
Figure 2:
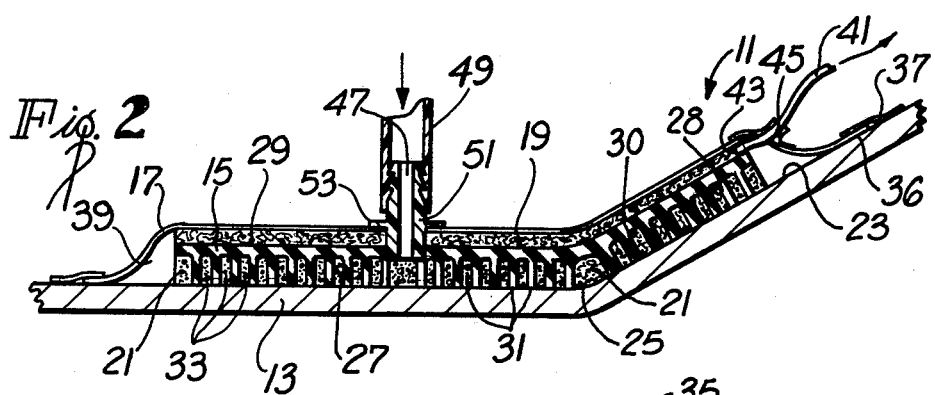
FIG. 2 is an enlarged fragmentary sectional view taken generally along line 2—2 of FIG. 1.
Figure 3:
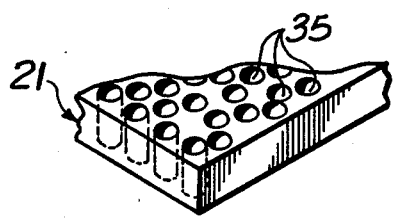
FIG. 3 is a fragmentary isometric view illustrating a portion of the core formed by the molding apparatus illustrated in FIGS. 1 and 2.

FIGS. 1 and 2 show a molding apparatus 11 which can be used with advantage to carry out the molding process of this invention. Generally, the molding apparatus 11 includes mold sections 13 and 15, a flexible sheet 17 and a mat 19 of flexible porous material. The molding apparatus 11 is arranged for molding or casting a core 21 (FIGS. 2 and 3) in situ. Thus, the mold section 13 in the specific embodiment illustrated is in the form of a curved panel constructed of fiberglass or other suitable material, with the panel forming a portion of a boat. The core 21 is adapted to be adhered to the mold section 13 and, thereafter, a second similarly configured panel (not shown) is attached to the other side of the core 21 to form a strong sandwich construction for the wall of the boat.

More specifically, the mold section 13 has a mold face 23 (FIG. 2) which has a relatively smooth finish. Although the mold face 23 can be of various different contours and configurations, in the embodiment illustrated, it is non-planar and has a curved section 25. The mold face 23 and the mold section 13 are relatively rigid.

The mold section 15 has a mold face 27 which is adapted to confront the mold face 23 and an outer surface 29. The mold face 27 can be of various different configurations and, it cooperates with the mold face 23 to define a mold cavity 28. In the embodiment illustrated, the mold section 15 includes a thin flexible web 30, a plurality of cylindrical projections 31 projecting from the web 30 and recesses 33 between the projections. The recesses 33 form at least part of the mold cavity 28. The projections 31 form holes 35 (FIG. 3), respectively, in the core 21. In addition, the projections 31 space the web 30 from the mold face 23.

The mold section 15 is integrally constructed of a suitable flexible material, such as rubber or a suitable plastic material. At least the web 30 of the mold section 15 should be sufficiently flexible to enable the mold section 15 to conform to the contour of the mold face 23.

The flexible sheet 17 is preferably in the form of an air impervious membrane. For example, the flexible sheet 17 may be constructed of a strong flexible plastic material.

The flexible sheet 17 has a peripheral edge portion 36 which is sealed to the mold face 23 by a suitable seal 37 which extends along the edge portion of the flexible sheet. Although the seal 37 can take different forms, in the embodiment illustrated, it includes tape for taping the edge portion 36 to the mold face 23. In this manner, the flexible sheet 17 cooperates with the mold face 23 to define a vacuum chamber 39. The mold section 15, the mold face 23 and the mat 19 are in the vacuum chamber 39.

During the molding process, the pressure in the vacuum chamber 39 is reduced to less than ambient by a vacuum tube 41 which projects through an opening in the flexible sheet 17 and terminates in an end portion 43 which is embedded in the mat 19 intermediate the surface 29 and the flexible sheet 17. A seal, such as tape 45, is used to seal the tube 41 to the opening in the flexible sheet 17 through which the tube 41 projects. The end of the tube 41 opposite the end portion 43 is coupled to a suitable vacuum source, such as a vacuum pump.

The mat 19 defines air passages between the surface 29 and the flexible sheet 17, even when the mat is compressed. For example, the mat may be in the form of non-woven dacron fibers or open-cell foam rubber or foam plastic. In the embodiment illustrated, the mat 19 is coextensive with the surface 29; however, this is not required as the mat may extend over less than the full area of the surface 29.

The air passages defined by the mat assure that there is a differential pressure across the region of the flexible sheet 17 which covers the surface 29 when the pressure in the vacuum chamber 39 is reduced. This differential pressure causes the flexible sheet to tightly hold the mold section 15 against the mold face 23. Thus, the flexible sheet is a force-applying member. The mat 19 also reduces the likelihood that the uncured material from which the core 21 is molded will be drawn into the vacuum tube 41.

The material which is to form the core 21 may be any suitable flowable material which can be cured or set. Various materials, including plastics and non-plastics can be used. For example, when plastics are being molded, they may be cellular or non-cellular, and by way of example, polyurethane, polyethylene and polyvinyl chloride foam materials may be molded with the apparatus 11.

The flowable material which is to form the core 21 can be flowed into the apparatus 11 at various different locations. In the embodiment illustrated, the flowable material is pumped through a central opening 47 in the mold section 15. For example, a material supply tube 49 may be releasably attached to a fitting 51 formed integrally with the mold section 13. The fitting 51 projects through aligned openings in the flexible sheet 17 and the mat 19, and a flange 53 integral with the fitting 51 overlies an annular zone of the flexible sheet around this opening. Tape or other suitable sealants can be used to seal the flange 53 to the flexible sheet 17.

To carry out the process of this invention, the components of the molding apparatus 11 are arranged as shown in FIGS. 1 and 2 and as described hereinabove. Thus, the first mold section 13 is supported with the mold face 23 exposed, and the second mold section 15 is supported with the mold face 27 confronting the mold face 23. The pressure in the vacuum chamber 39 is reduced by pulling a vacuum through the tube 41 and through the air passages formed by the mat 19. This creates a differential pressure across the flexible sheet 17 which holds the mold section 15 tightly against the mold face 23. A flowable material is pumped through the tube 49 and the fitting 51 to the mold cavity 28 to fill the mold cavity with the flowable material. The flowable material is then allowed to set to form the core 21.

Depending upon the materials which are utilized for the mold face 23 and the core 21, the molding process may result in the core adhering to the mold face 23. However, if desired, the mold face 23 can be coated with a suitable adhesive or resin prior to pumping the flowable material into the mold cavity 28 to thereby assure that the core 21 will be adhered to the mold face 23. Conversely, to permit withdrawal of the mold section 15 from the core 21, the mold face 23 can be coated with a suitable release agent, such as a silicone release agent, prior to the molding operation. For many applications, the flowable material sets or hardens with sufficient rapidity to avoid any significant quantity of the material flowing laterally beyond the periphery of the mold section 15.

Figure 4:
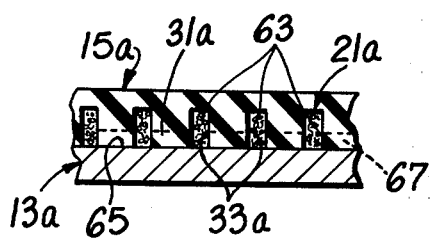
FIG. 4 is a fragmentary sectional view similar to FIG. 1 with the flexible sheet and the mat of porous material removed.

FIG. 4 shows by way of example an alternate core 21a. The core 21a is identical to the core 21 in all respects not shown or described herein and it may be made with the apparatus 11 in the same manner as described above with reference to FIGS. 1–3, except that the mold section 15a has projections 31a and recesses 33a of different configurations.

The primary difference between the cores 21a and 21 is that the core 21a comprises separate, elongated ribs 63 projecting from the mold section 13a and grooves 65 between adjacent ribs. Each of the ribs 63 is suitably adhered to the mold section 13a so that after the ribs are cast in situ, the mold section 13a serves as a web or panel for joining the ribs. The ribs 63 cooperate with the mold section 13a to define a series of channels 65 which can be used, for example, to carry electrical conductors. Lateral passages 67 in the mold section 15a join adjacent recesses 33a to facilitate distribution of the flowable material into all of the recesses 33a during molding.

Figure 5:
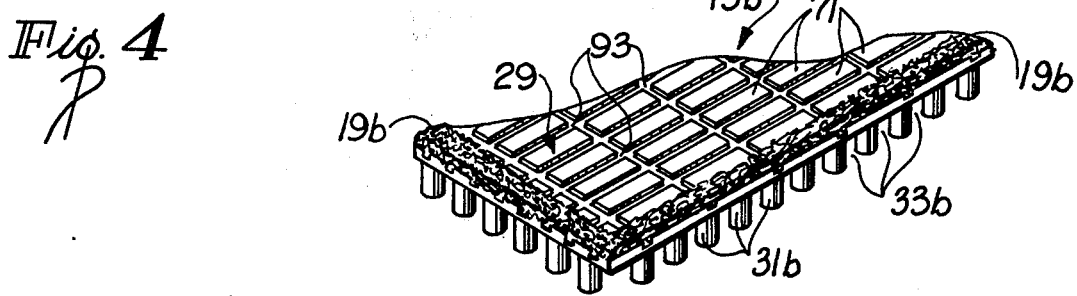
FIG. 5 is a fragmentary, isometric view illustrating an alternate construction for one of the mold sections.

FIG. 5 shows an alternate mold section 15b which is identical to the mold section 15 in all respects not shown or described herein. Portions of the mold section 15b corresponding to portions of the mold section 15 are designated by corresponding reference numerals followed by the letter "b."

The primary difference between the mold section 15b and the mold section 15 is that the surface 29 is comprised of numerous projections 71 and interconnected recesses 73. The receses 73 form air passages within the vacuum chamber adjacent the flexible sheet 17. Although the projections 71 and the recesses 73 permit the mat 19b to be completely eliminated, preferably, a mat 19b in the form of a narrow strip extending continuously along the entire periphery of the mold section 15b is preferably utilized. The vacuum tube 41 can then be inserted into the mat 19b, and the mat 19b prevents the flowable material from being drawn into the tube 41.

Although exemplary embodiments of the invention have been shown and described, many changes, modifications and substitutions may be made by one having ordinary skill in the art without necessarily departing from the spirit and scope of this invention.

I claim:

1. A method of molding a part comprising:
   providing first and second mold sections having mold faces of the desired configuration with the second mold section being flexible and with at least one of said mold sections having a plurality of projections and recesses between the projections;
   supporting the first mold section with the first mold face exposed;
   supporting the second mold section with the mold faces being in confronting relationship to define a mold cavity between the mold faces;
   engaging at least some of the projections with the mold face of the other of the mold sections with the recesses at least partially defining the mold cavity and the flexible second mold section following the contour of the mold face of the first mold section;
   placing a flexible sheet over the second mold section;
   forming a vacuum chamber utilizing the flexible sheet with at least the second mold section and the mold face of the first mold section being in said vacuum chamber;
   providing air passage means in the vacuum chamber between the flexible sheet and the second mold section;
   reducing the pressure in the vacuum chamber including the air passage means to less than ambient;
   flowing a curable flowable material into the mold cavity;
   allowing the material in the mold cavity to set to form the desired part; and
   removing the second mold section from the part in the mold cavity.

2. A method as defined in claim 1 wherein said step of providing includes providing the mold face of the first mold section with rigidity and with a non-planar configuration with the second mold section generally following the contour of the rigid, non-planar mold face of the first mold section.

3. A method as defined in claim 2 wherein said first-mentioned step of providing includes providing the first mold section as at least a portion of a component of a boat whereby the molding method is carried out in situ.

4. A method as defined in claim 3 wherein said one mold section is the second mold section whereby the desired part is in the form of a core, adhering said core to said mold face of said first mold section and said flowable material is a plastic material.

5. A method as defined in claim 4 wherein said step of reducing includes placing a tube between the flexible sheet and the second mold section in communication with the air passage means and withdrawing air from the vacuum chamber through said tube, said step of forming a vacuum chamber includes sealing the flexible sheet to the first mold section.

6. A method as defined in claim 1 wherein said second mold section has a surface which confronts the flexible sheet and said step of providing air passage means includes providing a plurality of projections and interconnecting recesses on said surface of said second mold section.

7. A method as defined in claim 1 wherein said step of reducing includes placing a tube between the flexible sheet and the second mold section in communication with the air passage means and withdrawing air from the vacuum chamber through said tube.

8. A method as defined in claim 1 wherein said step of forming a vacuum chamber includes sealing the flexible sheet to the first mold section.

9. A method as defind in claim 1 wherein said one mold section is the second mold section.

* * * * *